(12) United States Patent
Matsumoto et al.

(10) Patent No.: US 6,231,798 B1
(45) Date of Patent: May 15, 2001

(54) PROCESS FOR PRODUCING MULTI-LAYER MOLDED PRODUCT

(75) Inventors: Masahito Matsumoto, Ibaraki; Hitoshi Murotani, Toyonaka; Satoru Funakoshi; Shigeyoshi Matsubara, both of Osaka, all of (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 08/716,454

(22) PCT Filed: Mar. 27, 1995

(86) PCT No.: PCT/JP95/00555

§ 371 Date: Sep. 27, 1996

§ 102(e) Date: Sep. 27, 1996

(87) PCT Pub. No.: WO95/26262

PCT Pub. Date: Oct. 5, 1995

(30) Foreign Application Priority Data

Mar. 28, 1994 (JP) .................................................. 6-057227

(51) Int. Cl.[7] ............................. B29C 33/02; B29C 45/16
(52) U.S. Cl. .................. 264/255; 264/328.7; 264/328.8; 264/328.14; 264/328.16; 425/130; 425/573
(58) Field of Search ................................. 264/255, 328.8, 264/328.7, 328.14, 328.16; 425/130, 573

(56) References Cited

U.S. PATENT DOCUMENTS

| | | |
|---|---|---|
| 3,909,169 | 9/1975 | Barrie . |
| 4,014,966 * | 3/1977 | Hanning ............................... 264/45.1 |
| 4,717,324 * | 1/1988 | Schad et al. ........................... 425/130 |
| 4,775,308 | 10/1988 | Schad . |
| 4,808,101 | 2/1989 | Schad . |
| 4,863,369 | 9/1989 | Schad . |
| 4,931,234 | 6/1990 | Schad . |
| 5,154,872 | 10/1992 | Masui et al. .......................... 264/266 |
| 5,336,463 | 8/1994 | Hara et al. .......................... 264/328.7 |
| 5,405,557 | 4/1995 | Kingsbury . |
| 5,474,723 * | 12/1995 | Horikoshi ............................. 264/45.5 |
| 5,523,030 | 6/1996 | Kingsbury . |

FOREIGN PATENT DOCUMENTS

| | | |
|---|---|---|
| 0 246 512 A2 | 11/1987 | (EP) . |
| 2 279 535 | 2/1976 | (FR) . |
| 36-11637 | 7/1961 | (JP) . |
| 48-51954 | 1/1973 | (JP) . |
| 49-8143 | 1/1974 | (JP) . |
| 49-23261 | 3/1974 | (JP) . |
| 0039425 * | 3/1983 | (JP) . |

(List continued on next page.)

OTHER PUBLICATIONS

Patent Abstracts of Japan, vol. 12, No. 116 (M–694), Apr. 13, 1988 & JP 62 244610 A(Oct. 1987) Abstract.

*Primary Examiner*—Jan H. Silbaugh
*Assistant Examiner*—Suzanne E. McDowell
(74) *Attorney, Agent, or Firm*—Pillsbury Madison & Sutro LLP

(57) ABSTRACT

There is provided a process for producing a multi-layer molded product having a plurality of thermoplastic resin layers. This process provides for (i) a step of supplying first and second molten thermoplastic resins each through first and second resin supplying gates which are temperature-controllable independently of each other, to between female and male molds kept in an open state with a time difference being provided between supply starts of the first and second resins, and (ii) a step of closing the female and male molds after completion of supply of the first and second resins. The process enables production of high-quality multi-layer molded products having a plurality of resin layers with good repeatability under relatively low resin supply pressure and by single mold closing. Further, high-quality multi-layer molded products can readily be produced without restrictions on materials used.

12 Claims, 11 Drawing Sheets

FOREIGN PATENT DOCUMENTS

| | | |
|---|---|---|
| 62-184817 | 8/1987 | (JP) . |
| 62-268618 | 11/1987 | (JP) . |
| 63-104805 | 5/1988 | (JP) . |
| 63-309417 | 12/1988 | (JP) . |
| 3-247423 | 11/1991 | (JP) . |
| WO 94/23929 | 10/1994 | (WO) . |

* cited by examiner

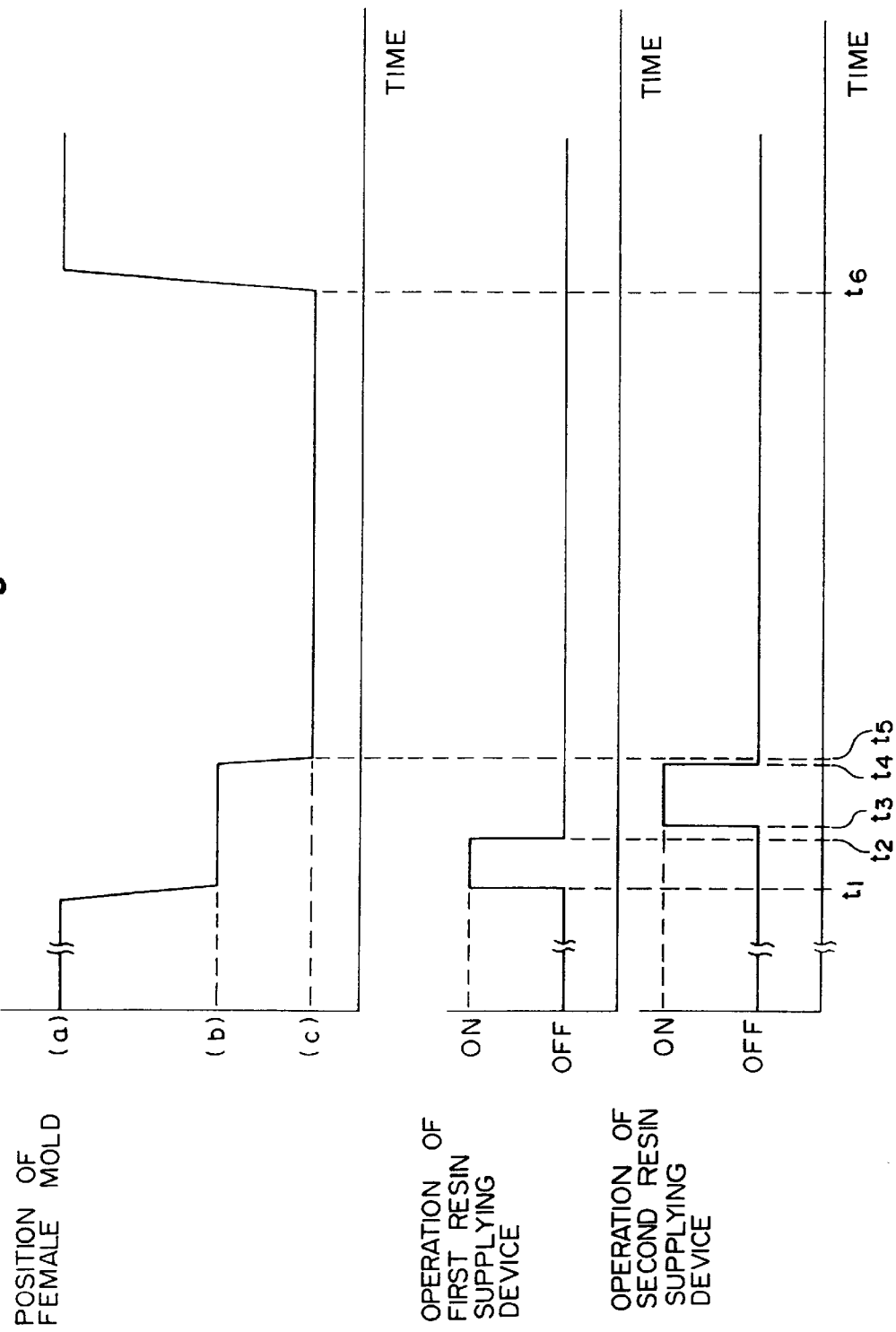

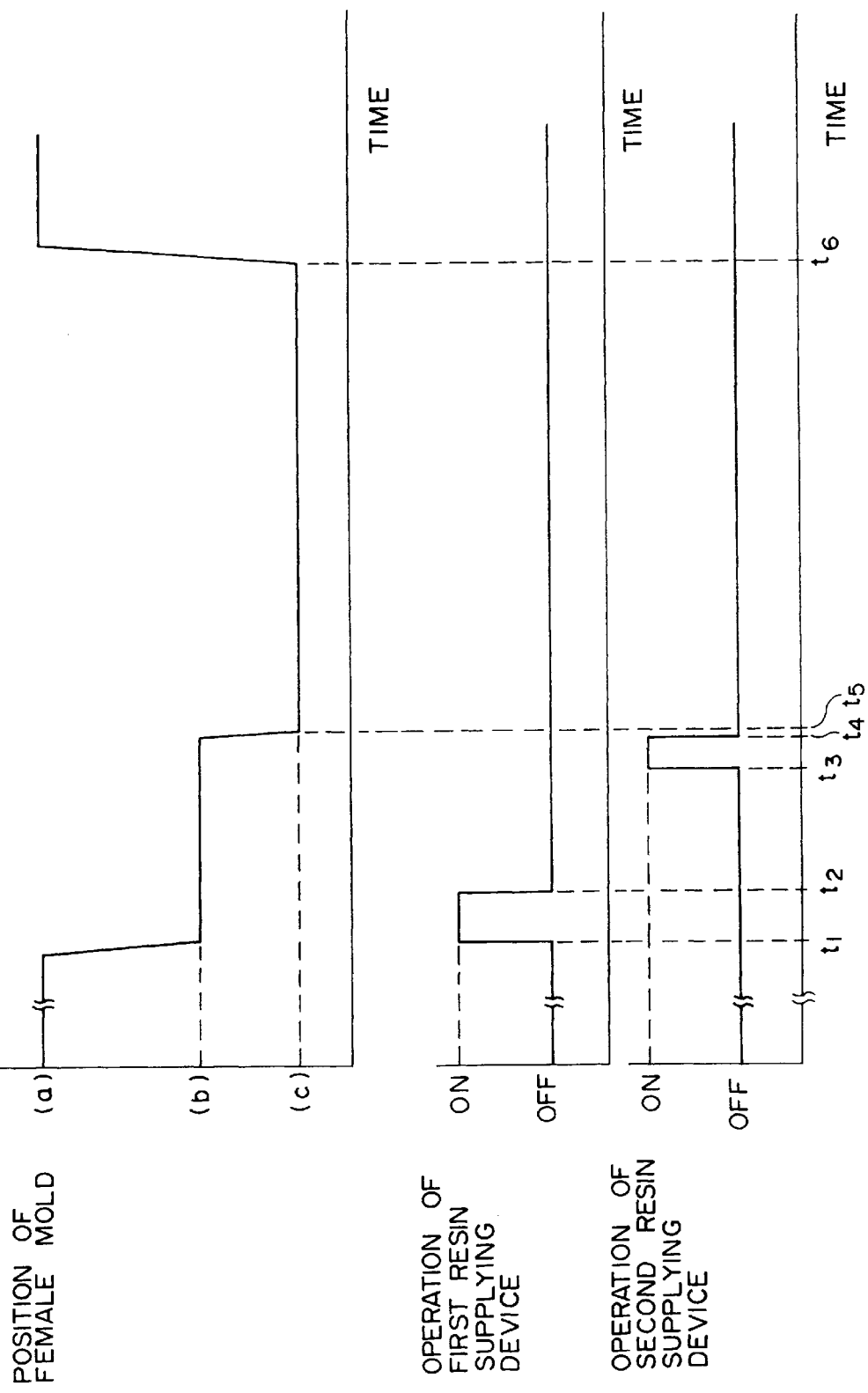

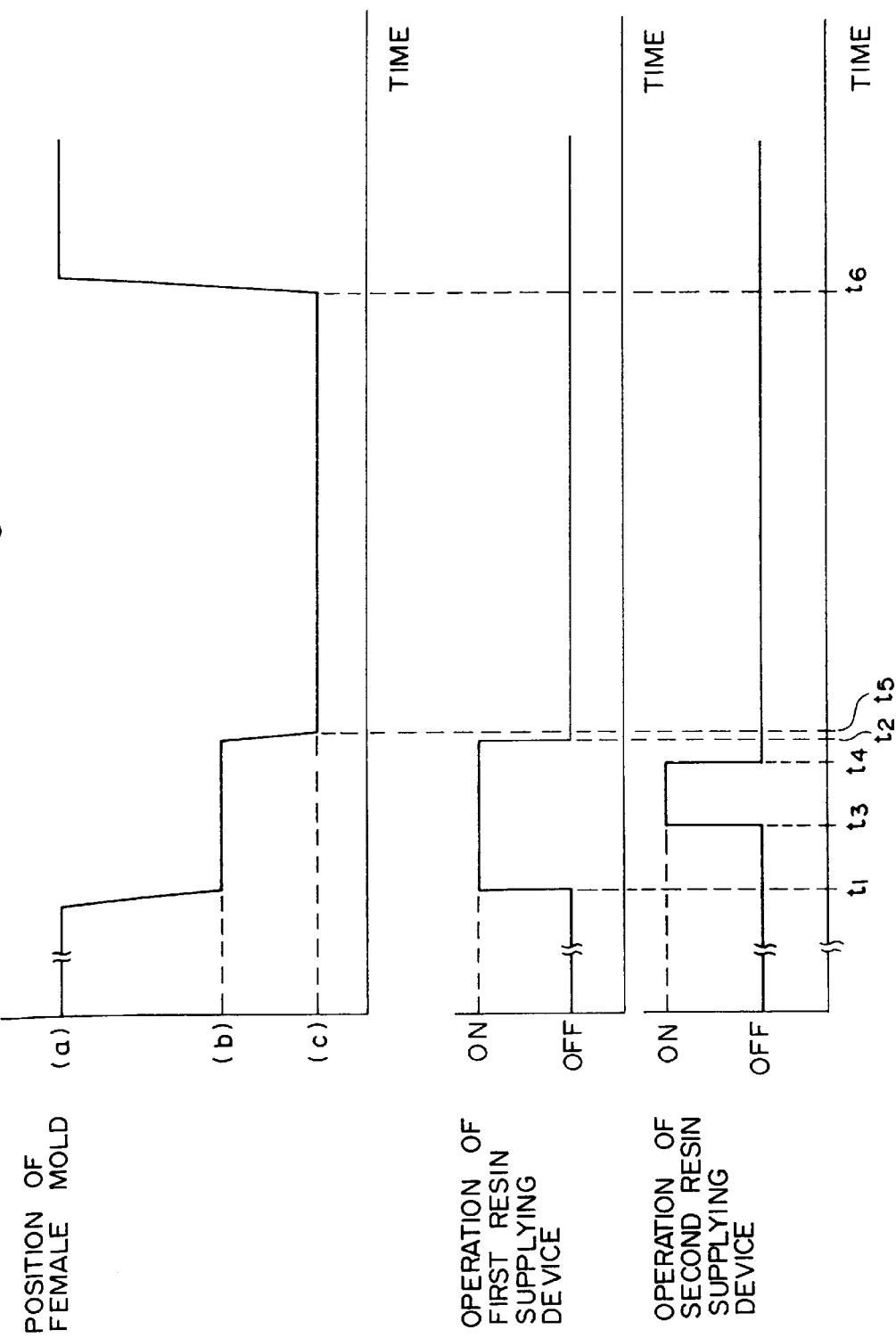

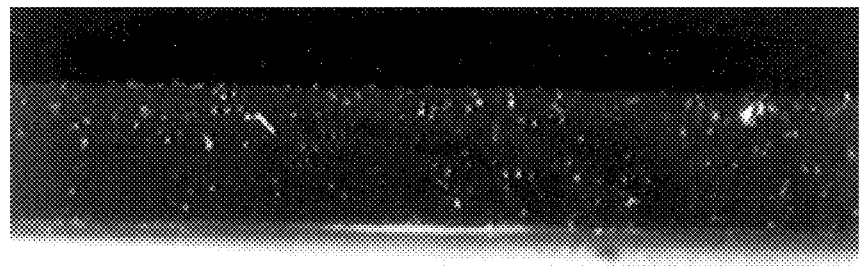
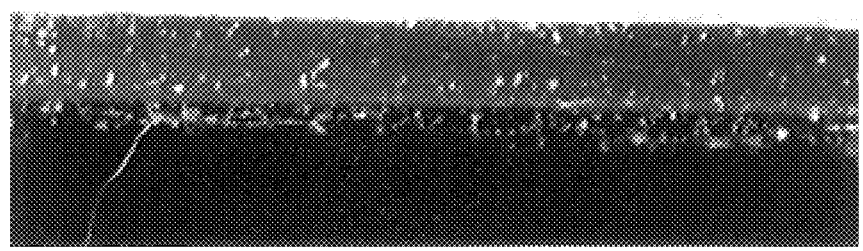
FIG. 15A
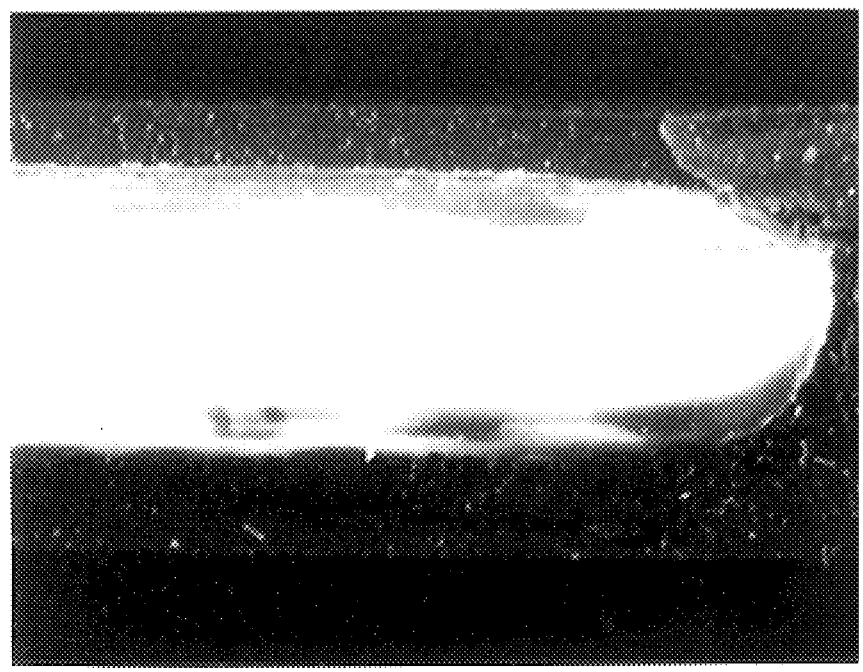
FIG. 15B

PROCESS FOR PRODUCING MULTI-LAYER MOLDED PRODUCT

This application claims benefit of international application PCT/JP95/00555, filed Mar. 27, 1995.

BACKGROUND OF THE INVENTION

1. Field of the Invention

The present invention relates to a process for producing a multi-layer molded product of thermoplastic resins.

2. Description of the Related Art

Multi-layer molded products as combinations of thermoplastic resins are conventionally well known, and the following methods are known as processes for producing them.

(1) A method for bonding sheets of thermoplastic resins preliminarily produced to each other (for example, as described in the Japanese Patent Application Laid-open Gazette No. Sho 63-104805), or a method for bonding such sheets at the same time as molding of the thermoplastic resins (for example, as described in the Japanese Patent Application Laid-open Gazette No. Sho 49-23261).

(2) A method by sandwich injection molding (for example, as described in the Japanese Patent Application Laid-open Gazette No. Sho 62-268618 corresponding to U.S. Ser. No. 862269 or in the Japanese Patent Application Laid-open Gazette No. Sho 63-309417 corresponding to U.S. Ser. No. 050680).

In addition, an example of a process for producing a multi-layer molded product consisting of a resin molded body and a skin material is the process as described in U.S. Pat. No. 5,154,872.

However, the methods in (1) described above need a lot of steps because they include molding of members preliminarily processed in the sheet form. The method in (2) described above needs high injection pressure and needs two mold-closing steps in order to obtain a two-layer molded product. Further, in the process described in above U.S. Pat. No. 5,154,872, supply pressure of resin is low and there are many losses of edges of the skin material.

SUMMARY OF THE INVENTION

Under such circumstances, an object of the present invention is to provide a process for producing a multi-layer molded product having a plurality of resin layers, which can solve the above problems. More specifically, an object of the present invention is to provide a process capable of producing a high-quality multi-layer molded product having a plurality of resin layers with good repeatability under relatively low resin supply pressure and by single mold closing. A further object of the present invention is to provide a process capable of producing a high-quality multi-layer molded product, even if the thermoplastic resins employed have suitable molding temperatures or melt temperatures (temperatures of supply resins) largely different from each other, without so much time or cost for production of molded product and without restrictions on the thermoplastic resins used.

DETAILED DESCRIPTION OF THE DISCLOSURE

The present invention provides a process for producing a multi-layer molded product, comprising:

a step of supplying first and second molten thermoplastic resins through first and second resin-supplying gates to between female and male molds kept in an open state with a time difference being provided between supply starts of the first and second resins, the first and second resin-supplying gates being temperature-controllable independently of each other; and a step of closing the female and male molds after completion of supply of said first and second resins.

Further, the present invention provides a process for producing a multi-layer molded product, comprising:

a step of closing female and male molds from a first open state in which the female and male molds are positioned with such a space that the multi-layer molded product can be taken out through between the female and male molds to a second open state in which a space between the female and male molds is smaller than the space in the first open state and a cavity clearance between the female and male molds is greater than a thickness of the desired multi-layer molded product;

a step of supplying a first thermoplastic resin in a molten state to between the female and male molds kept in the open state while controlling the first thermoplastic resin at a predetermined temperature higher than a melting point of the first resin and lower than a decomposition temperature thereof:

a step of supplying a second thermoplastic resin in a molten state to between the female and male molds while controlling the second thermoplastic resin at a predetermined temperature higher than a melting point of the second resin and lower than a decomposition temperature thereof separately and independently of the supply temperature of the first resin, after a lapse of a predetermined period of time from a supply start of the first thermoplastic resin;

a step of closing the molds from the open state to a closed state in which a cavity clearance between the female and male molds is substantially coincident with a thickness of the desired multi-layer molded product, and thereafter holding the molds in the closed state for a predetermined period of time to solidify the first and second thermoplastic resins; and a step of opening the space between the female and male molds to take the multi-layer molded product out through between the molds.

In one aspect of the present invention, supply of the second molten thermoplastic resin is started after completion of supply of the first molten thermoplastic resin. In another aspect of the present invention, supply of the second molten thermoplastic resin is started after start of supply of the first molten thermoplastic resin and before completion of supply of the first resin.

In the process of the present invention, supply of the second thermoplastic resin is preferably started after a surface solid layer is formed in the first thermoplastic resin supplied to between the female and male molds and, in one aspect of the present invention, the second thermoplastic resin is supplied without breaking through the surface solid layer of the first thermoplastic resin. In another aspect of the present invention, the second thermoplastic resin is supplied with breaking through a portion near the second resin supplying gate in the surface solid layer of the first thermoplastic resin and without breaking through the other portions.

In such a process of the present invention, because the first and second molten thermoplastic resins are supplied to between the female and male molds kept in the open state through the first and second resin supplying gates temperature-controllable independently of each other, the temperatures of the respective supply resins can be accurately controlled at suitable temperatures of the respective resins, so that repeatability can be greatly improved for a forming speed of the solid layer formed in the resin surface after each resin is supplied to between the molds. Therefore, the process of the present invention is effective to obtain the desired multi-layer molded product having at least one layer for each of the resins with good repeatability by setting the time difference between the supply starts of the first and second molten thermoplastic resins and properly selecting the time difference.

Namely, with poor repeatability of forming speed of surface solid layer, even if the period of time is constant between the supply start of the first molten thermoplastic resin and the supply start of the second molten thermoplastic resin, there is such a possibility that the resins are mixed with each other or that the resins are solidified more than necessary before closing of molds, which makes it difficult to produce good multi-layer molded products with good repeatability. In contrast with it, the process of the present invention assures high repeatability of forming speed of surface solid layer, and is thus free of the above problems.

Further, since the process of the present invention assures such high repeatability of forming speed of surface solid layer, it permits a control of whether the second resin breaks through the surface solid layer of the first resin or not to be effected in accordance with the period from the supply start of the first molten thermoplastic resin to the supply start of the second molten thermoplastic resin, which permits the structure of multi-layer molded product obtained thereby (for example, two-layer structure or three-layer structure) to be selectively produced depending upon the above time difference.

Since in the process of the present invention the first and second molten thermoplastic resins are supplied to between the female and male molds kept in the open state through the first and second resin supplying gates temperature-controllable independently of each other, deterioration or the like of the resins can be prevented even if the thermoplastic resins employed have the suitable molding temperatures or melting temperatures (temperatures of the supply resins) greatly different from each other, whereby good multi-layer molded products can be obtained without restrictions on the thermoplastic resins applied.

Further, because in the process of the present invention the first and second molten thermoplastic resins are supplied to between the female and male molds kept in the open state, each resin can be supplied accurately in a predetermined amount into the mold cavity under relatively low pressure without requiring such high pressure as in the injection molding. Even if the mold cavity is great, the resins can be charged evenly up to the corners of mold the cavity upon closing of molds, thus enabling the production of large multi-layer molded products.

The process of the present invention can produce the multi-layer molded product having a plurality of resin layers by single mold closing. Consequently, the process of the present invention can achieve reductions in production time and cost of multi-layer molded product, because it does not need an apparatus for injection under high pressure and a multi-layer molded product can be obtained by single mold closing.

The first and second thermoplastic resins employed in the process of the present invention may be of different kinds or of a same kind, but the process of the present invention is particularly effective in the cases where different thermoplastic resins are employed, especially in the cases where the thermoplastic resins employed have greatly different melting points.

Here, the aforementioned open state means a state in which the cavity clearance between the molds is larger than the thickness of a multi-layer molded product.

The female mold in the process of the present invention means a mold in an outer surface of which a recessed portion is formed, while the male mold means a mold in an outer surface of which a projected portion is formed so as to be engageable with the recessed portion formed in the female mold.

BRIEF DESCRIPTION OF DRAWINGS

FIG. 9 is a timing chart to show relations among the position of the female mold and the operations of the first and second resin supplying devices in the production steps of FIGS. 8A–8C.

FIG. 11 is a timing chart to show relations among the position of the female mold and the operations of the first and second resin supplying devices in the production steps of FIGS. 10A–10C.

FIG. 13 is a timing chart to show relations among the position of the female mold and the operations of the first and second resin supplying devices in the production steps of FIGS. 12A–12C.

FIGS. 15A and 15B are photographs each of which shows a cross section of a multi-layer molded product obtained in Example 1.

BEST MODE FOR CARRYING OUT THE INVENTION

Figure 1:
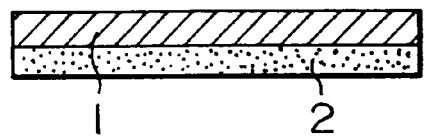
FIG. 1 to FIG. 4 are sectional views each of which shows an example of the multi-layer molded product obtained by the process of the present invention.

The present invention will be described in detail with reference to the drawings. In the drawings, same or corresponding portions will be denoted by same reference numerals.

First explained referring to FIG. 1 to FIG. 4 are multi-layer molded products which can be produced by the process of the present invention.

The present invention is characterized in that the first and second molten thermoplastic resins start to be supplied with the time difference to between the female and male molds kept in the open state through the first and second resin supplying gates which are temperature-controllable independently of each other, and a multi-layer molded product obtained is thus comprised of at least two resin layers corresponding to the resins used. These resin layers may be of a same kind or of different kinds according to types of the first and second resins used, but one layer of these resin layers and the other resin layer are generally made of different resins.

Figure 2:
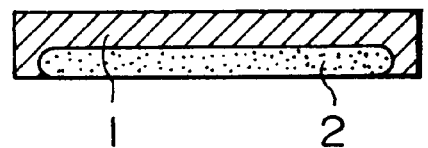
Figure 3:
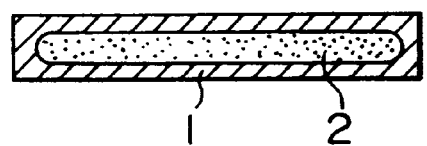
Figure 4:
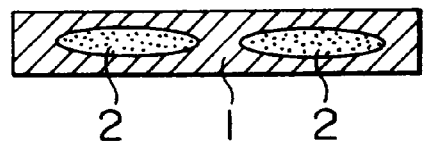

There is no specific limitation on the shape and structure of the multi-layer molded product produced by the process of the present invention, but specific examples thereof include a laminate body in which a first resin layer 1 is laminated on one surface of a second resin layer 2, as shown in FIG. 1, a laminate body in which the first resin layer 1 wraps one surface and edge portions of the second resin layer 2, as shown in FIG. 2, a laminate body in which the first resin layer 1 wraps all surfaces of the second resin layer 2, as shown in FIG. 3, and a laminate body of a structure in which the first resin layer 1 is studded with discontinuous parts of the second resin layers 2 (in islands-sea structure), as shown in FIG. 4.

Figure 5:
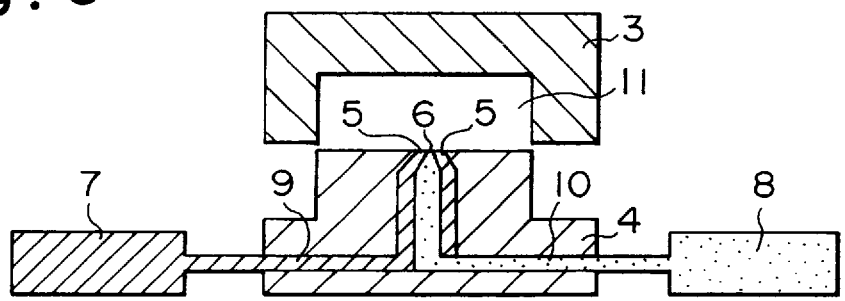
FIG. 5 is a schematic sectional view of an example of an apparatus for supplying the molten resins through molten resin passages provided in the mold, which is useful for the process of the present invention.
Figure 6:
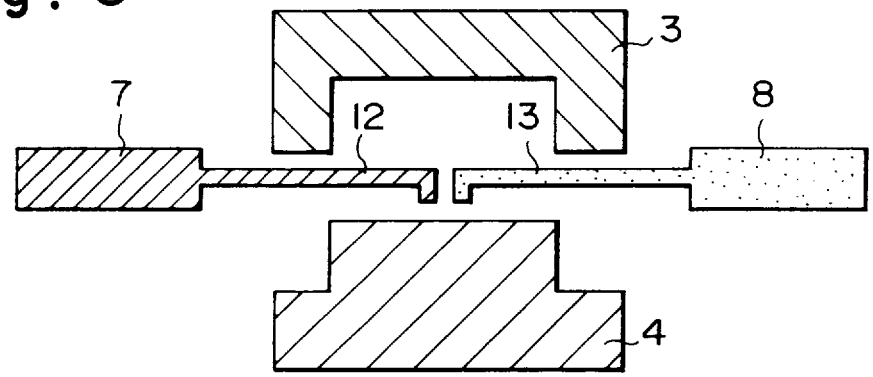
FIG. 6 is a schematic sectional view of an example of an apparatus for supplying the molten resins from external supplying devices set outside the molds to between the molds, which is useful for the process of the present invention.
Figure 7:
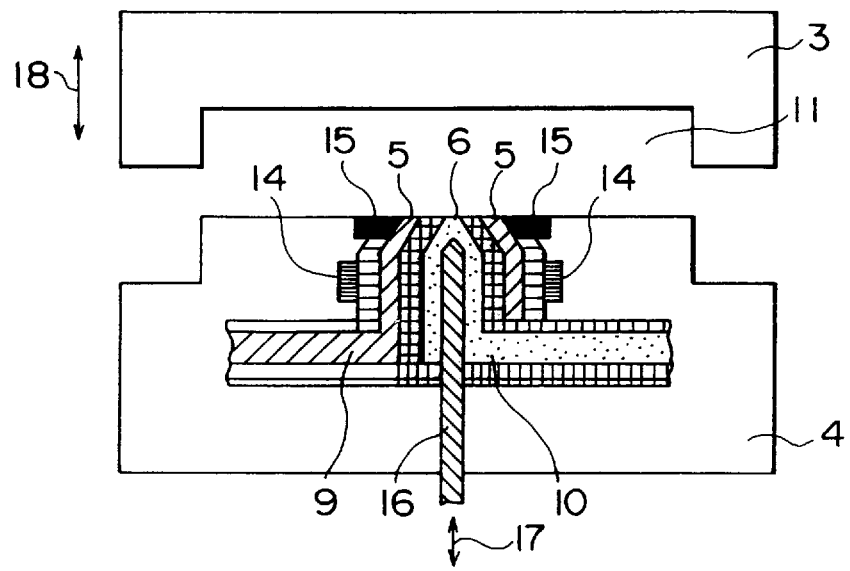
FIG. 7 is a schematic sectional view of an example of the molds provided with the first and second resin supplying gates on concentric circles, which is useful for the process of the present invention.

Next explained referring to FIG. 5 to FIG. 7 are the production apparatus useful for the process of the present invention, and resin supplying methods using them.

The process of the present invention for producing such multi-layer molded products employs a pair of female and male molds 3, 4 arranged as capable of being opened or closed, as shown in FIG. 5, and a cavity is formed between the molds 3, 4 in the shape substantially coincident with the shape of a desired product. The molds 3, 4 each are mounted on a press apparatus (not shown), and either one or the both can be moved in mold closing and mold opening directions, whereby the two molds 3, 4 can be opened or closed.

In the process of the present invention, while the above female and male molds 3, 4 are kept in the open state, the first and second thermoplastic resins 1, 2 of a same kind or of different kinds are supplied in a molten state and with the time difference between supply starts of the two resins through the first and second resin supplying gates 5, 6 temperature-controllable independently of each other.

One of methods for supplying the first and second resins into the mold cavity is a method for directly supplying the molten resins preliminarily plasticized (or melted) in plasticizing and extruding devices 7, 8 or the like into the cavity 11 through the resin passages connected to the plasticizing and extruding devices 7, 8 and provided inside the mold, as shown in FIG. 5. Another method is a method for supplying the molten resins preliminarily plasticized in the plasticizing and extruding devices 7, 8 or the like and measured in necessary amounts to between the molds kept in the open state, using an external supplying apparatus provided with the devices 7, 8 and resin passages 12, 13, as shown in FIG. 6. The supplying methods of the first and second resins are not particularly limited to the above methods, but the former method (the method as shown in FIG. 5) is preferable in respect of easiness in control of time period from completion of supply of molten resins to completion of mold closing and in control of resin supply positions.

In plasticizing the thermoplastic resins used, the first and second resins are plasticized separately from each other when they are of different kinds; but, if they are of a same kind, they may be plasticized separately or simultaneously and in the simultaneous cases, a common resin passage is used and nozzle portions of the first and second resin supplying gates are arranged to control resin amounts supplied through the respective supplying gates, and timings of supply.

When the supply of the molten thermoplastic resins 1, 2 into the mold cavity is the direct supply into the cavity 11 through the resin passages 9, 10 provided in the mold, as shown in FIG. 5, the first and second resin supplying gates 5, 6 may be located at various positions depending upon the shape of the desired product. For example, in producing the laminate body in which the first resin layer 1 is laminated on one surface of the second resin layer 2 (FIG. 1), the laminate body in which the first resin layer 1 wraps one surface and edge positions of the second resin layer 2 (FIG. 2), or the laminate body in which the first resin layer 1 wraps the all surfaces of the second resin layer 2 (FIG. 3), a preferred arrangement is such that the first resin supplying gate 5 and the second resin supplying gate 6 are juxtaposed next to each other or such that the first resin supplying gate 5 and the second resin supplying gate 6 are closely provided on concentric circles. The latter is particularly preferred. When the first resin supplying gate and second resin supplying gate are provided on concentric circles, the first resin supplying gate may be arranged in a ring shape outside and around the second resin supplying gate or the second resin supplying gate may be arranged in a ring shape outside and around the first resin supplying gate on the contrary. Either one of such arrangements is properly selected depending upon the shape or the like of the desired molded product.

When the resin supplying gate is formed in a ring shape, the ring supplying gate does not always have to be perfectly continuous, but may be discontinuously segmental with two or more segments. In the segmental case, the segments of resin supplying gate are preferably of a same size and are positioned on a concentric circle without deviation.

FIG. 7 schematically shows an example of the molds suitable for the present invention, in which the first and second resin supplying gates are provided on concentric circles.

In FIG. 7, reference numeral 3 denotes a female mold, 4 a male mold, 5 a first resin supplying gate, 6 a second resin supplying gate, 9 a molten resin passage for the first resin, 10 a molten resin passage for the second resin, 11 a cavity, and 14 a temperature controlling heater for the first resin.

Numeral 15 designates a temperature controlling portion (shut-off heater) having a shut-off function for supplying or stopping the first resin into the cavity 11 by melting or solidifying it near the supplying gate 5. The shut-off heater 15 and temperature controlling heater 14 are connected to a temperature controlling unit (not shown) for the first resin.

Numeral 16 represents a temperature controlling heater (shut-off pin) for the second resin in a pin structure provided in the resin passage 10 and also having a shut-off function, and the supplying gate 6 is opened or closed when the pin 16 is moved in upward or downward direction 17. The pin 16 is connected to a temperature controlling unit (not shown) for the second resin.

A plasticizing and extruding device (not shown) of the first resin is connected to the resin passage 9, and the device and the shut-off heater 15 compose a supplying unit of the first resin. On the other hand, a plasticizing and extruding device (not shown) of the second resin is connected to the resin passage 10, and the device and the shut-off pin 16 compose a supplying unit of the second resin. The supplying units of the first and second resins each can also be manipulated by hand or the like, but a preferable arrangement is such that an apparatus (not shown) for controlling the supply periods of the first and second resins is further connected to these units.

The female mold 3 and male mold 4 are mounted on a press apparatus (not shown), and the male mold 4 is fixed while the female mold 3 is movable in upward and downward directions 18. Further, the female mold 3 and male mold 4 are provided with mold temperature controlling apparatus (not shown), whereby the female and male molds 3, 4 are maintained at the predetermined temperatures lower than the melting points of the first and second resins.

The resin supplying gates etc. are provided in the male mold 4 in FIG. 7, but the resin supplying gates etc. may be provided in the female mold. The first resin supplying gate 5 is provided outside the second resin supplying gate 6 in FIG. 7, but the second resin supplying gate may be provided outside the first resin supplying gate.

The suitable method for supplying the resins in the present invention will be explained more specifically. Namely, an example explained is a method for directly supplying the molten thermoplastic resins through the resin passages provided in the molds into the cavity, where the molten resin supplying gates this time are arranged in such a manner that the first resin supplying gate 5 is closely provided in a ring shape on a concentric circle around the second resin supplying gate 6, as shown in FIG. 7.

In the process of the present invention, supply of a predetermined amount of the first molten thermoplastic resin is first started through the first resin supplying gate 5 temperature-controllable independently of the second resin supplying gate 6, to between the pair of female and male molds 3, 4 kept in the open state and with a predetermined cavity clearance.

Here, the above open state means a state in which the cavity clearance between the molds 3, 4 is larger than the thickness of the desired product (multi-layer molded product). In the process of the present invention, the foregoing open state covers (a) the first open state in which the two molds are positioned with such a space that the multi-layer molded product can be taken out through between the female and male molds 3, 4, and (b) the second open state in which the space between the two molds 3, 4 is smaller than the space in the first open state and the cavity clearance between the two molds is larger than the thickness of the desired multi-layer molded product, and the process preferably further comprises a step of closing the female and male molds 3, 4 from the first open state to the second open state before supply of the first and second resins.

As for the degree of opening of the female and male molds upon start of resin supply, if the cavity clearance between the female and male molds were too wide or extremely narrow, appearance of the multi-layer molded product obtained would be poor or no multi-layer molded product would be attained in some cases. Therefore, the cavity clearance between the female and male molds is normally preferably 1.2 to 20 times greater than the thickness of the final product.

Further, the temperature of the first resin supplying gate 5 is controlled at a predetermined temperature higher than the melting point of the first resin and lower than the decomposition temperature thereof, according to the first resin used.

Next, supply of a predetermined amount of the second molten thermoplastic resins is started through the second resin supplying gate 6 temperature-controllable independently of the first resin supplying gate 5 to between the pair of female and male molds 3, 4 after a lapse of the predetermined period from the start of supply of the first resin. On that occasion, the supply of the second resin through the second resin supplying gate 6 is preferably started after provision of a time difference during which with progress of resin supply the first molten thermoplastic resin comes to contact the female mold 3 faced to the cavity surface of the male mold 4 to be cooled by the mold so as to form a surface layer (surface solid layer).

The temperature of the second resin supplying gate 6 is controlled at a predetermined temperature higher than the melting point of the second resin and lower than the decomposition temperature thereof, according to the second resin used. Further, a total amount of the first resin and second resin supplied to between the molds 3, 4 is set to be nearly equal to the volume of the molded product to be obtained.

The time difference after start of supply of the first resin and before start of supply of the second resin differs depending upon the types of the resins used, combination of the resins, the thickness and size of the molded product to be obtained, and the molding conditions such as the mold temperature, and is properly selected depending upon the conditions; normally, the second resin is supplied 1 to 20 seconds after the start of supply of the first resin.

After the surface solid layer of the first molten thermoplastic resin is formed, supply of the second molten thermoplastic resin may be effected in parallel with supply of the rest of the first molten thermoplastic resin or after completion of supply of the first molten thermoplastic resin.

In the event the first and second molten thermoplastic resins are supplied in parallel, the first resin and second resin are desirably supplied so as to prevent the second resin from breaking through the first resin forming the outer layer and thus from coming out in the surface.

In the event the supply of the second resin is started after completion of supply of the first resin, the supply of the second resin may be started at the same time as completion of supply of the first resin, and the supply of the second resin is normally started within 20 seconds after the start of supply of the first resin.

If in the process of the present invention the time difference between the supply starts of the first resin and the second resin is short, the second resin will be supplied before sufficient formation of the surface solid layer on the inner side (or on the resin supplying gate side) of the first resin. Thus, the second resin breaks through the surface solid layer on the resin supplying gate side of the first resin to be supplied into the center layer of the first resin, thus attaining the laminate body in which the first resin layer 1 wraps the second resin layer 2, as shown in FIG. 3.

FIGS. 8A–8C and FIG. 9 show the states of the molds and the resins in this case and the relations among the position of the female mold and the operations of the respective resin supplying devices, respectively. In FIG. 9, (a) indicates the first open state in which the molds are positioned with such a space that the multi-layer molded product can be taken out through between the molds, (b) the second open state in which the cavity clearance between the molds is narrower than that in the first open state but greater than the thickness of the desired multi-layer molded product, and (c) a mold closed state in which the cavity clearance between the molds is substantially coincident with the thickness of the desired multi-layer molded product. Further, $t_1$ and $t_2$ represent the supply start and end times of the first resin, $t_3$ and $t_4$ the supply start and end times of the second resin, and $t_5$ and $t_6$ the mold closing start and end times, respectively.

Figure 8A:
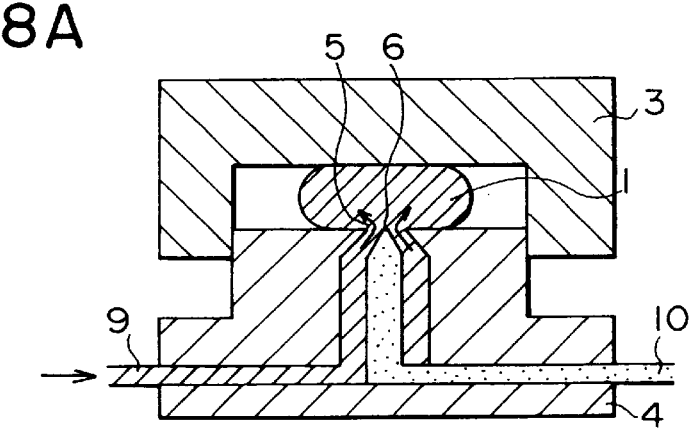
FIGS. 8A–8C are schematic sectional views each of which shows a state of the molds and the first and second resins in respective production steps in an example of the process of the present invention.

As shown in FIG. 9, after the female mold 3 is first moved down from the first open state (a) to the second open state (b), the first resin supplying device is actuated for a predetermined period ($t_1$–$t_2$). It causes the first resin 1 to be supplied through the passage 9 thereof and then through the first resin supplying gate 5 to between the female and male molds 3, 4 as controlled at the predetermined temperature (FIG. 8A).

Figure 8B:
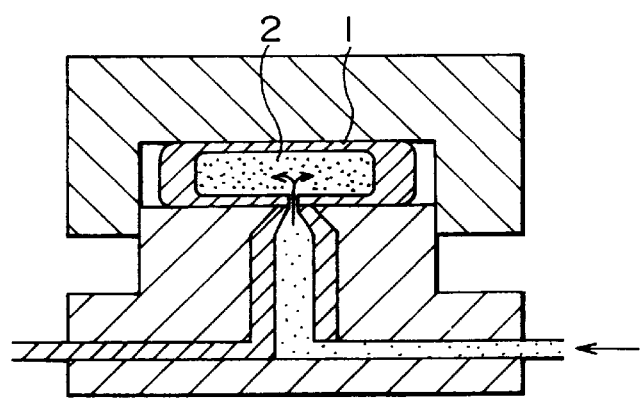

Next, after a relatively short period of time from the start of supply of the first resin, the second resin supplying device is actuated for a predetermined period ($t_3$–$t_4$). It causes the second resin 2 to be supplied through the passage 10 thereof and then through the first resin supplying gate 6 to between the female and male molds 3, 4 as controlled at the predetermined temperature, but, because in this case the second resin 2 is supplied before the surface solid layer (not shown) of the first resin 1 is sufficiently formed near the resin supplying gate, the second resin 2 breaks through the surface solid layer on the resin supplying gate side of the first resin 1 to be supplied into the center layer of the first resin 1 (FIG. 8B).

Figure 8C:
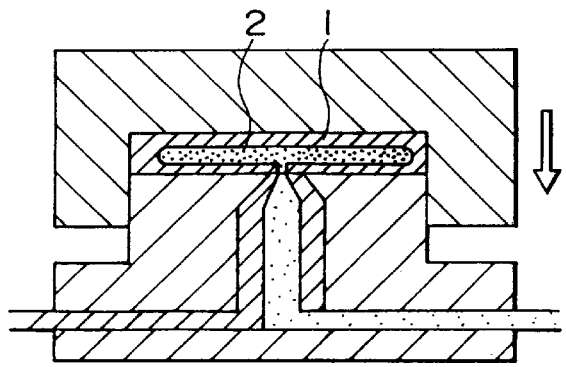

After that, the female mold is moved down from the second open state (b) to the mold closed state (c), and this state is maintained for a predetermined period ($t_5$–$t_6$) so as to sufficiently cool and solidify the first and second resins, thereby obtaining the multi-layer molded product as shown in FIG. 3 (FIG. 8C). Then the female mold 3 is moved up to the first open state (a) and the multi-layer molded product is taken out.

If the time difference between the supply starts of the two resins is long in the process of the present invention, along the surface solid layer formed on the resin supplying gate side of the first resin, first supplied, the second resin supplied after that flows so as to lift the first resin up, so that the first resin can flow around the second resin so as to cover the peripheral portion thereof, thus obtaining the laminate body in which the first resin 1 wraps one surface and edge portions of the second resin layer 2 as shown in FIG. 2.

On this occasion, by properly selecting the various conditions such as the types of the first and second resins, the melt temperatures of the resins, the mold temperature, the supplying speeds of the resins, and the thickness of product, and by selecting appropriate resin amounts, the resultant will be the laminate body in which the first resin layer 1 is laminated on one surface of the second resin layer 2, as shown in FIG. 1.

FIGS. 10A–10C and FIG. 11 show the states of the molds and the resins in this case, and the relations among the position of the female mold and the operations of the respective resin supplying devices, respectively. The reference symbols in FIGS. 10A–10C and FIG. 11 denote the same as those in FIGS. 8A–8C and FIG. 9 do, but in FIGS. 10A–10C the second resin supplying gate 6 is provided outside the first resin supplying gate 5.

Figure 10A:
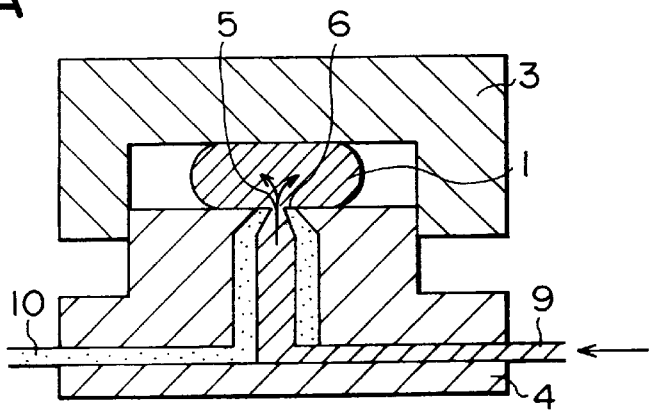
FIGS. 10A–10C are schematic sectional views each of which shows a state of the molds and the first and second resins in respective production steps in another example of the process of the present invention.
Figure 10B:
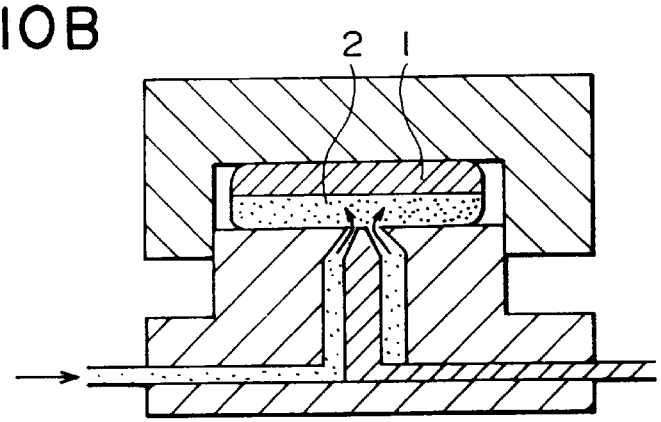
Figure 10C:
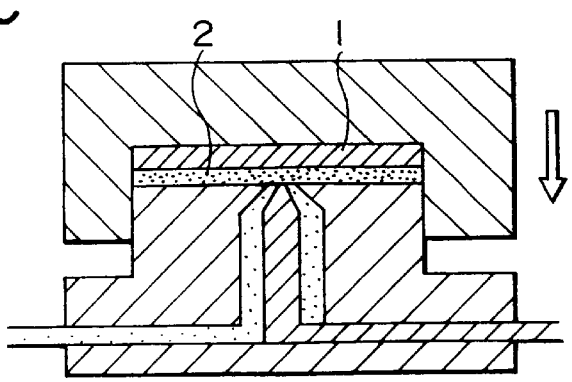

As shown in FIG. 11, the operations in this case are substantially the same as those shown in FIG. 9 except that the second resin supplying device is actuated for a predetermined period ($t_3$–$t_4$) after a lapse of a relatively long period of time from the supply start of the first resin. Since in this case the second resin 2 is supplied after the surface solid layer (not shown) of the first resin 1 is sufficiently formed also near the resin supplying gate, the second resin 2 is supplied to between the bottom surface of the first resin 1 and the top surface of the male mold 4 (FIG. 10B), and mold closing thereafter results in forming the multi-layer molded product shown in FIG. 1 or FIG. 2 (the multi-layer molded product shown in FIG. 1 in the case of FIG. 10C) (FIG. 10C).

Further, in the case where in the process of the present invention the supply of the second resin is started after the start of supply of the first resin, then the first and second resins are supplied in parallel for a predetermined period, and supply of the first resin is further continued even after completion of supply of the second resin, the laminate body as shown in FIG. 3 can also be obtained with the first resin layer 1 wrapping the all surfaces of the second resin layer 2.

FIGS. 12A–12C and FIG. 13 show the states of the molds and the resins in this case, and the relations among the position of the female mold and the operations of the respective resin supplying devices, respectively. Reference symbols in FIGS. 12A–12C and FIG. 13 denote the same as those in FIGS. 8A–8C and FIG. 9 do.

Figure 12A:
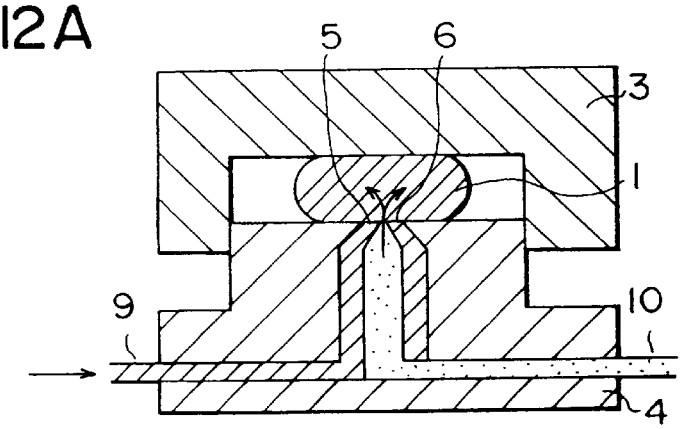
FIGS. 12A–12C are schematic sectional views each of which shows a state of the molds and the first and second resins in respective production steps in still another example of the process of the present invention.
Figure 12B:
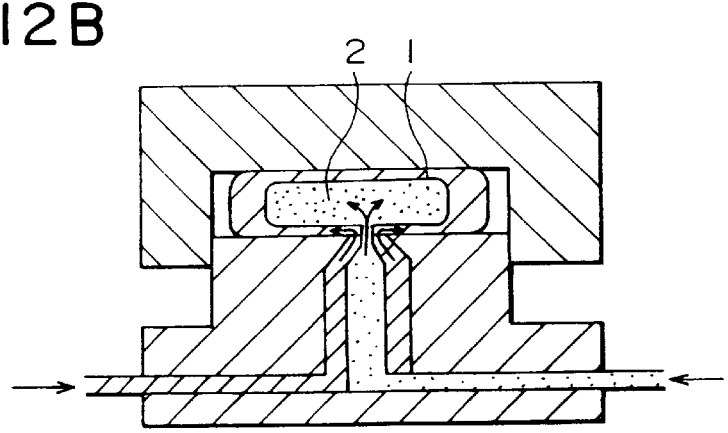
Figure 12C:
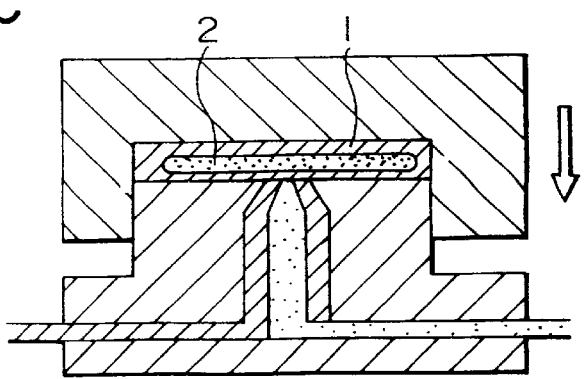

As shown in FIG. 13, the operations in this case are substantially the same as those shown in FIG. 9 except that after a lapse of a relatively short time from the supply start of the first resin the second resin supplying device is actuated for a predetermined period ($t_3$–$t_4$) as keeping the first resin supplying device actuated and the first resin supplying device is further actuated for a predetermined period after the second resin supplying device is stopped. In this case, the second resin 2 is supplied into the center layer of the first resin 1 and the first resin 1 is continuously supplied to between the second resin 2 and the top surface of the male mold 4 (FIG. 12B). Mold closing after that results in forming the multi-layer molded product shown in FIG. 3 (FIG. 12C).

The above examples used the male mold 4 provided with one first resin supplying gate 5 and one second resin supplying gate 6, but the male mold 4 used may be provided with plural sets of first resin supplying gates 5 and second resin supplying gates 6, each set thereof arranged on concentric circles, spaced at appropriate intervals of resin supplying gates, which can obtain the laminate body of the structure in which the first resin 1 is studded with discontinuous parts of the second resin 2 (in the islands-sea structure), as shown in FIG. 4.

Figure 14A:
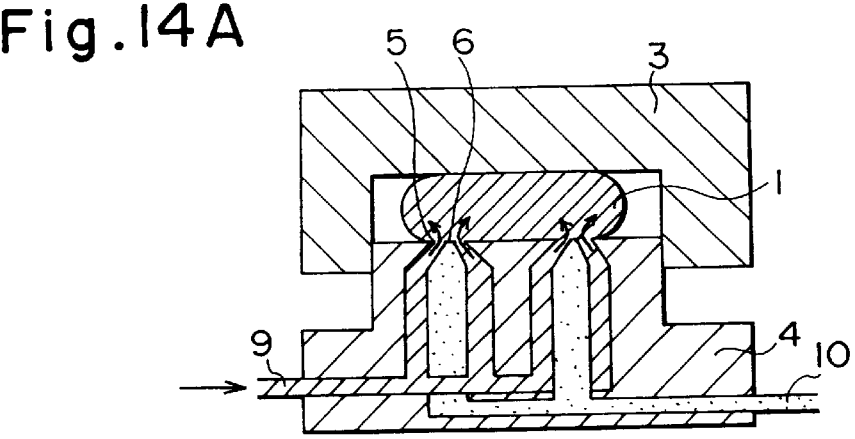
FIGS. 14A–14C are schematic sectional views each of which shows a state of the molds and the first and second resins in respective production steps in still another example of the process of the present invention.
Figure 14B:
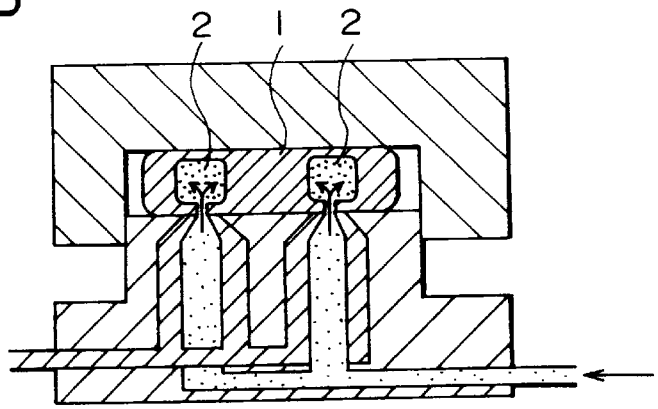
Figure 14C:
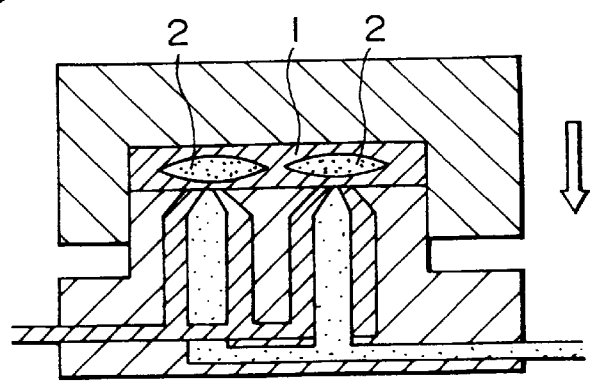

FIGS. 14A–14C show the states of the molds and the resins in this case. Reference symbols in FIGS. 14A–14C denote the same as those in FIGS. 8A–8C do.

The operations in this case may be substantially the same as those shown in FIG. 9 or FIG. 13. In this case, the second resin 2 is supplied into portions of the center layer of the first resin 1 above the second resin supplying gates 6 (FIG. 14B), and mold closing after that results in forming the multi-layer molded product shown in FIG. 4 (FIG. 14C).

In the above examples the first and second resins are supplied while the molds are stopped in the second open state, but the first and/or second resins may be supplied while the molds are being closed. In this case, the supply of the first and second resins needs to be completed before the molds go into the mold closed state.

If the first resin supplying gate 5 and second resin supplying gate 6 are arranged not on concentric circles but adjacent to each other, the laminate bodies can also be obtained approximately in the same manner as described above, but in this case slight deviation tends to occur between the first resin layer 1 and the second resin layer 2 (for example, they become a little asymmetric), when compared with those by the above processes.

Further, when the molten resins preliminarily plasticized and measured are supplied to between the molds 3, 4 kept in the open state, using the external supplying devices 7, 8, as shown in FIG. 6, the laminate body as shown in FIG. 1 can be obtained by first supplying the first resin and thereafter supplying the second resin in an amount equal to or less than that of the first resin onto the first resin. Further, the laminate body as shown in FIG. 2 can be obtained by first supplying the first resin and thereafter supplying the second resin in an amount greater than that of the first resin onto the first resin. Further, the laminate body as shown in FIG. 3 can be obtained by first supplying the first resin, thereafter supplying the second resin in an amount smaller than that of the first resin onto the first resin, and further again supplying the first resin thereonto.

In either of the above processes, the first resin first starting to be supplied begins to solidify and to form the surface solid layer at start of supply of the second resin, preferably. Therefore, the melt temperature of the first resin first starting to be supplied is preferably higher than or at least equal to the melt temperature of the second resin next starting to be supplied. If the situation is opposite, the surface solid layer of the first resin supplied first will be melted by the second resin of the higher temperature than it, supplied thereafter, so that the two resins will be mixed at their interface, which makes it difficult to obtain a desired laminate body.

Of course, the first resin is not always mixed with the second resin when the second resin temperature is higher than the first resin temperature. Therefore, in the cases where the interface between the two resins does not always have to be clear, the melt temperature of the first resin may be lower than that of the second resin.

It is thus very important in the present invention to control the melt temperatures of the supplied resins. Among others, when different resins are used, it is necessary to sufficiently control the temperatures of the supplying gates of the respective resins in accordance with the used resins so that each resin supplying gate may keep the melt temperature upon supply constant without being affected by the temperature of the other resin supplying gate. For that purpose, it is necessary for each resin supplying gate according to the present invention to be arranged as temperature-controllable independently.

For example, if the first resin supplying gate is provided on a concentric circle closely around the foregoing second resin supplying gate, each resin supplying gate is provided with a heater for temperature control and, if necessary, a thermal insulating material is further provided between the first resin supplying gate and the second resin supplying gate so as to prevent the thermoplastic resins from moving between the two resin supplying gates.

This permits the resins supplied through the respective resin supplying gates to be maintained at the predetermined melt temperatures without being affected by the temperature of adjacent resin supplying gate.

If each resin supplying gate is not temperature-controlled independently, the melt temperatures of the first and second resins supplied are not kept constant as affected by the temperature of adjacent resin supplying gate, and they become higher or lower than necessary, which would greatly affect formation of the surface solid layer of resin in the molds, thus failing to obtain the desired multi-layer molded product.

Next explained is a mold closing step in the process of the present invention.

In the process of the present invention, the female and male molds are closed after completion of supply of the above first and second resins.

More specifically, the step for closing the female and male molds in the process of the present invention is preferably a step of closing the molds from the above open state to the mold closed state in which the cavity clearance between the two molds is substantially coincident with the thickness of the desired multi-layer molded body and thereafter holding the mold closed state for a predetermined period of time to sufficiently cool and solidify the first and second thermoplastic resins.

Moreover, the process of the present invention further comprises a step of taking the multi-layer molded product out through between the molds as opening the clearance between the female and male molds after the step of closing the female and male molds.

The mold closing pressure, cooling temperature (mold temperature), and cooling period (holding period of the mold closing state) are properly determined depending upon various conditions including the types of the resins used, the thickness of product, and so on.

Explained in the end are the thermoplastic resins applied to the process of the present invention.

Examples of the thermoplastic resins applicable to the present invention include ordinary thermoplastic resins such as polyethylene, polypropylene, polystyrene, acrylonitrile, styrene-butadiene copolymer, polyvinyl chloride, polyamide, polycarbonate, polyethylene terephthalate, polybutylene terephthalate, polyphenylene ether, and styrene-acrylonitrile copolymer; thermoplastic elastomers; and polymer alloys using these thermoplastic resins.

These thermoplastic resins may be used singly or as a mixture thereof.

These thermoplastic resins may contain reinforcing fibers such as glass fibers or carbon fibers and/or a filler such as talc, wollastonite or calcium carbonate, as occasion demands, and they, of course, may contain an additive such as various coloring agents, antioxidants, or ultraviolet absorbers usually used.

A combination of these thermoplastic resins is properly selected depending upon a use purpose of the necessary multi-layer molded product, and there is no specific limitation thereon.

For example, polypropylene is selected as the second resin corresponding to the base part while a thermoplastic elastomer as the first resin corresponding to the surface layer, thereby forming a multi-layer molded product having the surface layer with excellent feeling of touch. In another example, polypropylene containing glass fibers is used as the second resin while polypropylene as the first resin, thereby obtaining a multi-layer molded product with excellent strength and appearance.

The present invention will be described in further detail with its examples, but it should be noted that the present invention is by no means limited to the examples.

EXAMPLE 1

In this example a multi-layer molded product was produced using the pair of female and male molds 3, 4 as shown in FIG. 7, in which the male mold 4 has the resin supplying gates 5, 6 (FIGS. 8A–8C), and in accordance with the timing chart as shown in FIG. 9.

The second resin supplying gate 6 was of a circle having the diameter 1.5 mm while the first resin supplying gate 5 was of an annulus having the outer diameter 20 mm and the inner diameter 15 mm provided on a concentric circle with the second resin supplying gate 6. The mold temperatures of the female and male molds 3, 4 both were set at 80° C. and the temperatures of the first resin supplying gate 5 and the second resin supplying gate 6 at 240° C. and 200° C., respectively.

First, the press apparatus (not shown) was actuated to close the female and male molds 3, 4, being in the first open state (a) in which the two molds were positioned with such a space (600 mm) that an operator could take the multi-layer molded product out through between the female and male molds 3, 4 by hand, up to the second open state (b) in which the cavity clearance between the molds was 15 mm (which was five times greater than the thickness of the final product).

Next, power was supplied to the shut-off heater 15 of the first resin supplying gate 5 to melt the first resin 1 at the tip portion of the supplying gate 5, whereby 400 g of a molten thermoplastic elastomer (trade name: Sumitomo TPE3752) was supplied as the first resin 1 at the supplying rate of 100 g/sec through the first resin supplying gate 5 to between the female and male molds 3, 4 in the second open state (b) (FIG. 8A). The period ($t_1$–$t_2$) from supply start to end of the first resin was four seconds. The supply pressure of the first resin was approximately 50 kgf/cm².

Subsequently, the shut-off pin 16 for the second resin was opened one second after completion of supply of the first resin 1, and then 200 g of a molten polypropylene resin (trade name: Sumitomo NOBLEN AH561) was supplied as the second resin 2 at the supplying rate of 40 g/sec through the second resin supplying gate 6. The period ($t_1$–$t_3$) from the supply start of the first resin to the supply start of the second resin was five seconds, and the period ($t_3$–$t_4$) from the supply start to the end of the second resin was five seconds. The supply pressure of the second resin was approximately 50 kgf/cm².

In the present example, the second resin 2 was supplied before the surface solid layer (not shown) was formed sufficiently in the first resin 1 near the resin supplying gate, so that the second resin 2 was supplied into the center layer of the first resin 2 as breaking through the surface solid layer on the resin supplying gate side of the first resin 1. Accordingly, at the time of completion of supply of the second resin 2, the resultant structure was such that the first resin 1 wrapped the second resin 2 over the entire surfaces of the second resin 2 except for the portion immediately above the second resin supplying gate 6 (FIG. 8B).

The temperatures of the first and second resins supplied were maintained constant at 238° C. and at 210° C., respectively, during supply of each resin.

After supply of the second resin 2 was completed by closing the shut-off pin 16 of the second resin supplying gate 6, the press apparatus (not shown) moved the female mold 3 down at the mold closing speed 30 mm/sec, so as to close the female and male molds 3, 4 up to the mold closed state (c) where the cavity clearance between the molds was 3 mm (FIG. 8C). Then the female and male molds 3, 4 were maintained in the mold closed state (c) for 30 seconds to sufficiently cool and solidify the first and second resins, and thereafter the female and male molds 3, 4 were opened to the first open state (a). Then the multi-layer molded product was taken out. The multi-layer molded product thus obtained was a multi-layer molded product consisting of an outer layer material of the first resin 1 and an inner layer material of the second resin 2, as shown in FIG. 3. FIG. 15A and FIG. 15B show photographs of cross sections at a portion near the resin supplying gate and at an end of the multi-layer molded body thus obtained.

This multi-layer molded body was a disk having the product thickness (average) of 3 mm, the thickness of the outer layer material (average) of approximately 1 mm, and the diameter of approximately 500 mm. In this example, deterioration of each resin was not observed, and no inner layer material came out through the surface of the molded product.

The same operation as described was repeated, and it was confirmed that multi-layer molded products were able to be produced in the same structure and with good repeatability.

EXAMPLE 2

Using the pair of female and male molds 3, 4, which were the same as those used in Example 1 except that the first resin supplying gate 5 and the second resin supplying gate 6 were switched (FIGS. 10A–10C), the multi-layer molded product was produced according to the timing chart as shown in FIG. 11.

The mold temperatures of the female and male molds 3, 4 both were set at 80° C., and the temperatures of the first resin supplying gate 5 and second resin supplying gate 6 at 240° C. and at 210° C., respectively.

First, the press apparatus (not shown) was actuated to close the female and male molds 3, 4 being in the first open state (a) up to the second open state (b) where the cavity clearance between the molds was 5 mm (which was two and half times greater than the thickness of the final product), in the same manner as in Example 1.

Next, the shut-off pin of the first resin supplying gate 5 was opened to supply 200 g of a molten thermoplastic elastomer (trade name: Sumitomo TPE3752) as the first resin 1 at the supplying rate of 50 g/sec through the first resin supplying gate 5 to between the female and male molds 3, 4 kept in the second open state (b), and thereafter the shut-off pin of the first resin supplying gate 5 was closed (FIG. 10A). The period ($t_1$–$t_2$) from the supply start to the end of the first resin was four seconds. The supply pressure of the first resin was approximately 100 kgf/cm².

The power was supplied for three seconds to the shut-off heater of the second resin supplying gate 6 ten seconds after completion of supply of the first resin 1, so as to melt the second resin 2 at the tip portion of supply gate 6, thereby supplying 200 g of a molten polypropylene resin (trade name: Sumitomo NOBLEN AH561) as the second resin 2 at the supplying rate of 40 g/sec through the second resin supplying gate 6 to between the female and male molds 3, 4. The period ($t_1$–$t_3$) from the supply start of the first resin to the supply start of the second resin was 17 seconds, and the period ($t_3$–$t_4$) from the supply start to the end of the second resin was 5 seconds. The supply pressure of the second resin was approximately 50 kgf/cm².

In this example, the second resin 2 was supplied after the surface solid layer (not shown) was sufficiently formed in the first resin 1 also near the resin supplying gate, so that the second resin 2 was supplied to between the bottom surface of the first resin 1 and the top surface of the male mold 4. Accordingly, at the time of completion of supply of the second resin 2, the resultant structure was such that the second resin 2 slipped into under the first resin 1 (FIG. 10B).

The temperatures of the first and second resins supplied were maintained constant at 246° C. and at 212° C., respectively, during supply of each resin.

Figure 16A:
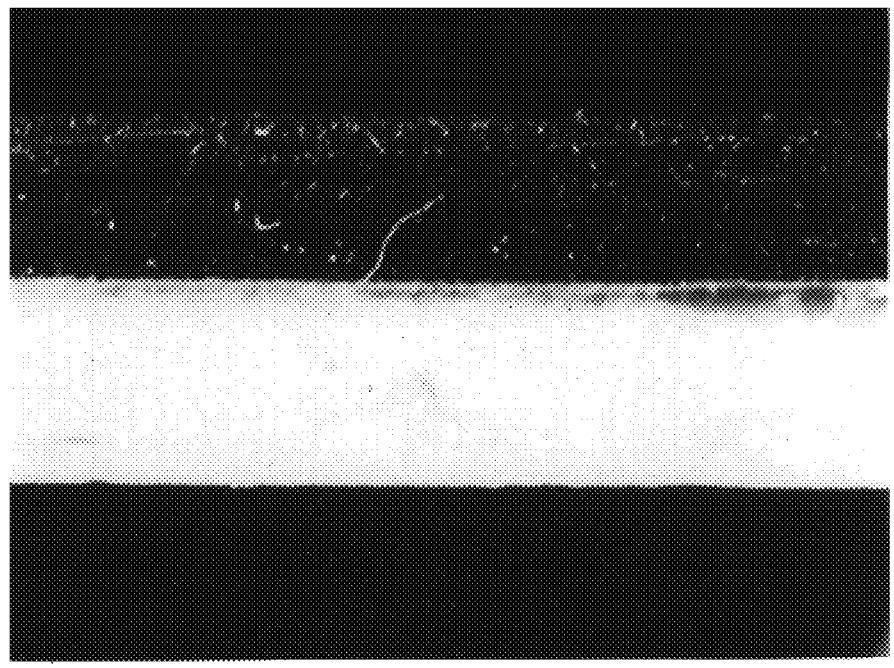
FIGS. 16A and 16B are photographs each of which shows a cross section of a multi-layer molded product obtained in Example 2.
Figure 16B:
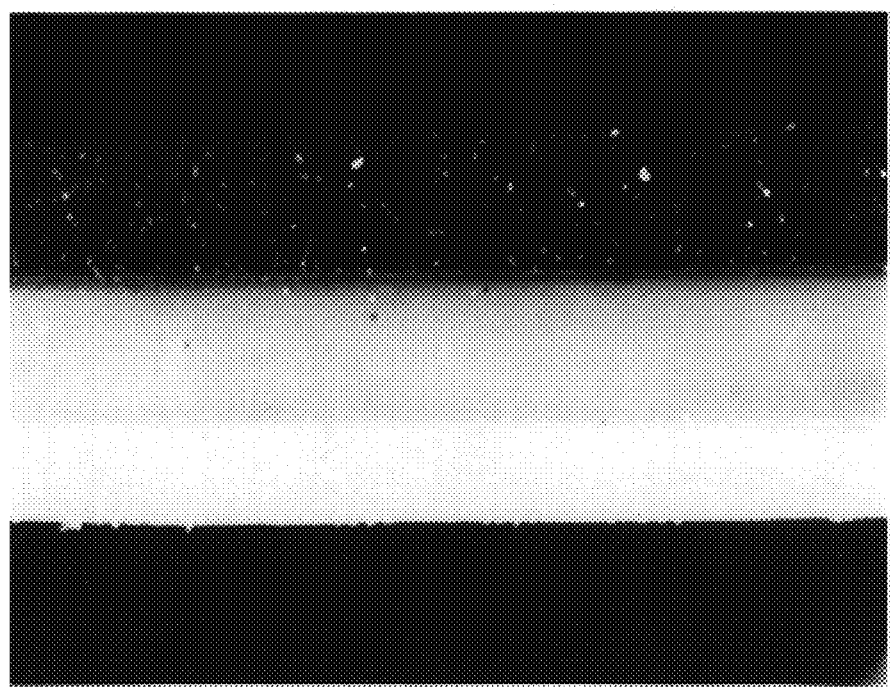

After completion of supply of the second resin 2, the press apparatus (not shown) moved the female mold 3 down at the mold closing speed of 30 mm/sec to close the female and male molds 3, 4 up to the mold closed state (c) where the cavity clearance between the molds was 2 mm (FIG. 10C). Then the female and male molds 3, 4 were maintained in the mold closed state (c) for 30 seconds to sufficiently cool and solidify the first and second resins and thereafter the female and male molds 3, 4 were opened to the first open state (a). Then the multi-layer molded body was taken out. The multi-layer molded body obtained was a multi-layer molded product consisting of an outer layer material of the first resin 1 and a base material of the second resin 2, as shown in FIG. 1. FIG. 16A and FIG. 16B show photographs of cross sections at a portion near the resin supplying gate and at an end of the multi-layer molded product obtained.

This multi-layer molded product was a disk having the product thickness (average) of 2 mm, the thickness of the outer layer material (average) of about 1 mm, and the diameter of about 500 mm. In this example, deterioration of each resin was not observed, and no mixture was observed between the base material and the outer layer material.

The same operation as described above was repeated, and it was confirmed that multi-layer molded products were able to be produced in the same structure and with good repeatability.

Industrial Applicability

The process of the present invention enables to produce the high-quality multi-layer molded products having a plurality of resin layers with good repeatability under relatively low resin supplying pressure and by single mold closing. Accordingly, the process of the present invention achieves reductions of time and cost necessary for producing the multi-layer molded product. Further, the process of the present invention enables to readily produce the high-quality multi-layer molded products without any restriction on the materials used (the thermoplastic resins) and even in the case of the thermoplastic resins used having the suitable molding temperatures or melt temperatures (the temperatures of the supply resins) greatly different from each other.

What is claimed is:

1. A process for producing a multilayer molded product, comprising the steps of:

providing female and male molds such that a mold cavity is defined therebetween, independent first and second resin-supplying gates, and independent first and second heaters to control respective temperatures of said first and second resin-supplying gates, wherein the first and second resin supplying gates are situated with respect to first and second heaters to control respective temperatures of said first and second resin-supplying gates, wherein the first and second resin-supplying gates are situated with respect to the molds such that
  (a) the gates separately extend from distinct points external to the molds to independent points between the molds in opposing fashion,
  (b) the gates are situated inside in either the female or the male mold, forming independent concentric rings, or
  (c) the gates are adjacent to each other within either the female or the male mold; then supplying the first molten thermoplastic resin through the first resin-supplying gate to the mold cavity between the female and male molds kept in a open state, while the first heater controls the temperature of the first thermoplastic resin at a predetermined temperature higher than a melting point of the first resin and lower than a decomposition temperature thereof;

permitting the first molten resin to form a surface layer;

supplying the second thermoplastic resin in a molten state through the second resin-supplying gate to the mold cavity between the female and male molds kept in an open state, while the second heater controls the temperature of the second thermoplastic resin at a predetermined temperature higher than a melting point of the second resin and lower than a decomposition temperature thereof separately and independently of the supply temperature of said first resin, after a lapse of a predetermined period of time from supply start of the first thermoplastic resin, thereby forming a second layer;

moving said female and male molds from the open state to a closed state whereby the cavity clearance is substantially coincident with the thickness of the desired multi-layer molded product;

cooling and solidifying said first and second resins in the mold cavity in the closed state; and opening said female and male molds to take out the multi-layer molded product; wherein in the steps of supplying the first and second resins, the total volume of resin supplied is nearly equal to the final volume of the desired molded product, and whereby a cavity clearance greater than the thickness of the desired multi-layer molded product is achieved.

2. A process for producing a multi-layer molded product according to claim 1, wherein said first resin supplying gate is provided on a concentric circle with respect to the second resin supplying gate.

3. A process for producing a multi-layer molded product according to claim 1, wherein supply of the second molten thermoplastic resin is started after supply start of the first molten thermoplastic resin and before completion of supply of the first resin.

4. A process for producing a multi-layer molded product according to claim 1, wherein supply of the second molten thermoplastic resin is started after completion of supply of the first molten thermoplastic resin.

5. A process for producing a multi-layer molded product according to claim 1, wherein a cavity clearance between the female and male molds upon supply of the first and second resins is 1.2 to 20 times greater than a thickness of a desired multi-layer molded product.

6. A process for producing a multi-layer molded product according to claim 1, wherein the first and second thermoplastic resins are different thermoplastic resins.

7. A process for producing a multi-layer molded product according to claim 1, wherein said multi-layer molded product comprises at least one layer of the first thermoplastic resin and at least one layer of the second thermoplastic resin.

8. A process for producing a multi-layer molded product according to claim 1, wherein said open state comprises a first open state in which the female and male molds are positioned with such a space that the multi-layer molded product can be taken out through between the female and male molds and a second open state in which a space between the female and male molds is smaller than the space in said first open state and a cavity clearance between the female and male molds is larger than a thickness of a desired multi-layer molded product, said process further comprising a step of closing the female and male molds from said first open state to said second open state before supply of the first and second resins.

9. A process for producing a multi-layer molded product according to claim 1, wherein the second thermoplastic resin is supplied without breaking through the surface solid layer of said first thermoplastic resin.

10. A process for producing a multi-layer molded product according to claim 1, wherein the second thermoplastic resin is supplied with breaking through a portion near the second resin supplying gate in the surface solid layer of said first thermoplastic resin and without breaking through the other portions.

11. A process for producing a multi-layer molded product according to claim 1, wherein a supply temperature of the second thermoplastic resin is not more than a supply temperature of the first thermoplastic resin.

12. A process for producing a multi-layer molded product according to claim 1, wherein temperatures of said female and male molds are maintained at temperatures lower than melting points of said first and second thermoplastic resins.

* * * * *